3,586,647
SOLID STATE POLYCONDENSATION WITH POROUS POLYESTER PREPOLYMER PARTICLES
Ross A. Kremer, Belle Mead, N.J., assignor to Mobil Oil Corporation
No Drawing. Filed July 10, 1968, Ser. No. 743,631
Int. Cl. C08g 53/10, 17/04
U.S. Cl. 260—2.5   8 Claims

ABSTRACT OF THE DISCLOSURE

Porous pellets of a polyester prepolymer, such as poly(ethylene terephthalate), are prepared by dispersing an inert gas or foaming agent in a molten prepolymer and extruding and pelletizing the thus saturated prepolymer to conventional pellet size, (1/16" to 1/2") or to other particulate shapes. These porous particles can be further polycondensed in solid state, under conventional polycondensation conditions, without the necessity of reducing particle size below 20 mesh.

BACKGROUND OF THE INVENTION

Field of the invention

This invention is directed to the preparation of high molecular weight polyesters. It is more particularly concerned with the preparation of porous polyester prepolymer pellets that are polycondensed in the solid state without reducing the particle size.

Description of the prior art

The methods for polycondensing polyester prepolymers to higher molecular weight polyesters in the solid state have been described in U.S. Pats. Nos. 3,075,952; 3,330,809; 3,342,782; and 3,344,091. In order to obtain commercially attractive polymerization rates in solid state polycondensation, these processes require that the particle size of the prepolymer be reduced by grinding to below 20 mesh. This, in turn, raises a requirement that the intrinsic viscosity (I.V.) of the prepolymer be controlled to be below 0.45, in order to facilitate the grinding operation. Accordingly, a process that eliminates the need for expensive grinding and for control of I.V. is highly desirable.

SUMMARY OF THE INVENTION

This invention provides porous polyester prepolymer particles that are subjected to dry-state polycondensation without reducing to a small particle size. This is accomplished by dispersing an inert gas or foaming agent in the molten polyester prepolymer (I.V. 0.3–1.2), extruding, and particulating.

DESCRIPTION OF SPECIFIC EMBODIMENTS

Polyesters that can be treated in accordance with the process of this invention include besides poly(ethylene terephthalate), which is used for illustration, such polyesters as poly(ethylene 2,6-naphthalate), poly(1,4-cyclohexanedimethylene terephthalate), copoly (90–98 mole percent ethylene terephthalate and 2–10 mole percent ethylene succinate) and a wide variety of polyesters and copolyesters, such as enumerated in U.S. Pat. No. 3,342,782 with particular reference to columns 19 and 20 and the patents referred to therein. In fact, it will be recognized that this process is applicable to any polyester (or copolyester) prepolymer that can be subjected to solid state polycondensation.

As indicated hereinbefore, it was necessary to limit the I.V. of the polyester prepolymer to no higher than 0.45, in order to be able to grind it to small particle size. As it is not necessary to resort to grinding or other methods to reduce particle size in the process of this invention, a higher I.V. can be used. Accordingly, the I.V. of the polyester prepolymer can be between about 0.3 and about 1.2. It will be understood that the prepolymer will contain the well-known polycondensation catalysts, such as $Sb_2O_3$, titanium compounds, etc.

In accordance with this invention, an inert gas or a foaming agent is dispersed in the polyester prepolymer while in the molten state at temperatures between about 260° C. and about 300° C. The inert gas can be nitrogen, helium, argon, and other nonreactive, moisture-free gases. Dry nitrogen appears to be most advantageous because it is readily available in dry pure form at reasonable cost. Combustion gas from various commercial operations (flue gas), after it has been dried and freed of oxygen and carbon monoxide, can also be used. A satisfactory method for dispersing the gas in the prepolymer is to pressure the gas (e.g., nitrogen) into the melt at the vent port of a conventional single screw extruder.

The usual application of the method of this invention is, as part of prepolymer preparation, to saturate the prepolymer while still in the molten state. It is not, however, limited thereto. As will be apparent to those skilled in the art, solid polyester prepolymer from any source can be remelted and foamed, within the contemplation of this invention.

After the molten polyester prepolymer has been foamed, it is extruded and pelletized. The techniques of extrusion and pelletizing of polymers is well known in the art, and it is believed unnecessary to burden this specification by redescribing such known techniques. Within the contemplation of this invention, the pellets can be between about 1/16" x 1/16" and about 1/2" x 1/2" in size. Although pellets are a preferred and convenient particle form, other particle forms are contemplated. Thus, for example, solid foamed prepolymer can be crushed or coarsely ground to particles of the aforedescribed size.

The porous polyester prepolymer pellets can be subjected to further polycondensation without the need for reducing particle size, below 20 mesh, as is called for in the prior art. With the exception of the particle size requirement, however, the techniques and conditions of solid state (or phase) polymerization of the porous pellets are the same as described in the art. Attention is directed to, for example, U.S. Pat. No. 3,342,782 and the description commencing in column 13, line 52 et seq., disregarding the particle size requirement. Generally, solid state polycondensation conditions include temperatures of about 1–80° C. below the normal melting point of the polymer and the use of subatmospheric pressure or of an inert entrainer gas.

Example 1.—Poly(ethylene terephthalate) prepolymer having an I.V. of 0.93 and containing 0.05 weight percent $Sb_2O_3$ catalyst was prepared, and while still molten, nitrogen was dispersed therein by pressurizing the reactor to 150 p.s.i.g. with nitrogen and agitating the prepolymer for 15 minutes.

The molten prepolymer was then extruded and pelletized. Part of the prepolymer was pelletized to 1/8" x 1/8" size and the rest to 1/4" x 1/4" size.

Example 2.—A portion (50 g.) of the 1/8" x 1/8" pellets of Example 1 was polycondensed in the solid state for 3 hours at 230° C. and 0.1 torr pressure. The condensation was carried out in the rotating round bottom flask immersed in a thermostated hot oil bath. The polymer product had an I.V. of 1.51.

Example 3.—The procedure of Example 2 was repeated, except that the reaction time was extended to 6 hours. The polymer product had an I.V. of 1.76.

Example 4.—A portion (50 g.) of the 1/4" x 1/4" pellets of Example 1 was polycondensed in the solid state for 30 minutes at 230° C. and 0.1 torr pressure in the apparatus described in Example 2. The polymer product had an I.V. of 1.24.

Example 5.—For comparison purposes, poly(ethylene terephthalate) having an I.V. of 0.89 was prepared ($Sb_2O_3$ catalyst) and extruded and pelletized to 1/8" x 1/8" size non-porous pellets. A portion (50 g.) of these pellets was polycondensed in the solid state for 3 hours at 230° C. at 0.1 torr pressure in the apparatus described in Example 2. The polymer product had an I.V. of 0.94.

Example 6.—Poly(ethylene terephthalate) prepolymer having an I.V. of 0.40 and containing 0.05 weight percent $Sb_2O_3$ was prepared, and while still molten, nitrogen was dispersed in it as described in Example 1. The prepolymer was extruded and pulverized into 4–8 mesh pieces. A portion (50 g.) of this polymer was polycondensed in the solid state of 2 hours at 230° C. and 0.1 torr pressure in the apparatus described in Example 2. The polymer product had an I.V. of 0.93.

Example 7.—For comparison purposes, poly(ethylene terephthalate) having an I.V. of 0.36 and containing 0.05 weight percent $Sb_2O_3$ was prepared and extruded and pelletized to 1/8" x 1/8" non-porous pellets. A portion (50 g.) of these pellets was polycondensed in the solid state for 2 hours at 230° C. and 0.1 torr pressure in the apparatus described in Example 2. The polymer product had an I.V. of only 0.45.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. In the preparation of linear condensation polyesters, wherein a saturated polyester having an I.V. of 0.3–1.2 is formed, the melt is solidified, and the polymerization is continued in the solid phase, the improvement that comprises dispersing an inert gas or foaming agent in molten saturated polyester prepolymer, extruding said prepolymer to form a solid foam, and particulating said foamed prepolymer to foam particles having a size of 1/16" to 1/2"; and polycondensing said foam particles in the solid state without reduction in particle size until an I.V. of at least 0.3 higher than that of the prepolymer is obtained.

2. The process defined in claim 1, wherein said polyester prepolymer is poly(ethylene terephthalate).

3. The process defined in claim 1, wherein said inert gas is nitrogen.

4. The process defined in claim 2, wherein said inert gas is nitrogen.

5. The process defined in claim 1, wherein said particles are pellets.

6. The process defined in claim 2, wherein said particles are pellets.

7. The process defined in claim 3, wherein said particles are pellets.

8. The process defined in claim 4, wherein said particles are pellets.

References Cited
UNITED STATES PATENTS

| | | | |
|---|---|---|---|
| 3,390,134 | 6/1968 | Kibler | 260—75(M) |
| 3,405,098 | 10/1968 | Heighton et al. | 260—75(M) |
| 3,470,114 | 9/1969 | Siggel et al. | 260—2.5(R) |

MURRAY TILLMAN, Primary Examiner

W. T. BRIGGS, SR., Assistant Examiner

U.S. Cl. X.R.

260—75, 95; 264—51